United States Patent
Bhaskaran

(10) Patent No.: US 10,432,808 B2
(45) Date of Patent: Oct. 1, 2019

(54) USER INPUT BASED PRINT TRAY CONTROL

(71) Applicants: Hewlett-Packard Development Company, L.P., Houston, TX (US); Shinoj Bhaskaran, Bangalore (IN)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/085,950

(22) PCT Filed: Jun. 27, 2016

(86) PCT No.: PCT/IN2016/050204
§ 371 (c)(1),
(2) Date: Sep. 17, 2018

(87) PCT Pub. No.: WO2018/002942
PCT Pub. Date: Jan. 4, 2018

(65) Prior Publication Data
US 2019/0089854 A1    Mar. 21, 2019

(51) Int. Cl.
*H04N 1/00* (2006.01)
*B41J 11/48* (2006.01)
(Continued)

(52) U.S. Cl.
CPC ........ *H04N 1/00633* (2013.01); *B41J 11/485* (2013.01); *B41J 13/103* (2013.01);
(Continued)

(58) Field of Classification Search
USPC ......................................................... 358/1.15
See application file for complete search history.

(56) References Cited

U.S. PATENT DOCUMENTS 6,921,222 B2    7/2005  Ng et al.
7,804,521 B2    9/2010  Silverbrook et al.
(Continued)

FOREIGN PATENT DOCUMENTS

CN    1617050 A    5/2005
CN    1891478 A    1/2007
(Continued)

*Primary Examiner* — Ngon B Nguyen
(74) *Attorney, Agent, or Firm* — HP Inc. Patent Department

(57) ABSTRACT

A printing device (102) comprises a plurality of feeder print trays (104) to hold print media to be used for printing. The printing device (102) further comprises a plurality of user input sensors (106), such that a user input sensor (106) is provided in proximity to each of the plurality of feeder print trays (104) to sense at least one user input provided by a user on an outer surface of a casing of the corresponding feeder print tray (104). Further, an input tray control module (108) is communicatively coupled to the plurality of input sensors (106). The input tray control module (108) correlates the user input as selection of the corresponding feeder print tray (104) and subsequently determines selection attributes corresponding to the user input. The input tray control module (108) further determines a tray control action to be initiated for the selected feeder print tray (104) based on the user input data and the selection attribute.

20 Claims, 5 Drawing Sheets

(51) Int. Cl.
*B41J 13/10* (2006.01)
*G06F 3/12* (2006.01)

(52) U.S. Cl.
CPC .......... *G06F 3/1205* (2013.01); *G06F 3/1253* (2013.01); *H04N 1/00411* (2013.01); *H04N 1/00962* (2013.01)

(56) References Cited

U.S. PATENT DOCUMENTS

| | | |
|---|---|---|
| 8,976,401 B2 | 3/2015 | Kawahara |
| 2005/0082737 A1* | 4/2005 | Sasaki ................ G03G 15/6508 271/9.12 |
| 2006/0133874 A1 | 6/2006 | Han et al. |
| 2013/0256980 A1* | 10/2013 | Mizuno ................ B65H 1/00 271/162 |
| 2016/0059545 A1 | 3/2016 | Watanabe et al. |

FOREIGN PATENT DOCUMENTS

| | | |
|---|---|---|
| CN | 101281673 A | 10/2008 |
| CN | 102372187 A | 3/2012 |
| CN | 103538356 A | 1/2014 |
| JP | 2006001086 A | 1/2006 |
| JP | 2014125318 A | 7/2014 |

\* cited by examiner

UNITED STATES PATENT

USER INPUT BASED PRINT TRAY CONTROL

BACKGROUND

Printing devices are peripherals commonly used in home and office environments for obtaining printed copies of digital documents. The printing devices are provided with different print trays for handling print media during a print job. For instance, the printing devices are provided with feeder print trays for holding and receiving print media that maybe of different or same sizes and type, thus allowing the user to print documents on different print media without changing the print media each time before initiating a print job. Further, the printing devices may include an output print tray for providing a printed media. With advancement in technology, the printing devices are designed to include advanced operating features that allow a user to optimally control and use the printing devices and the print trays.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

Figure 1:
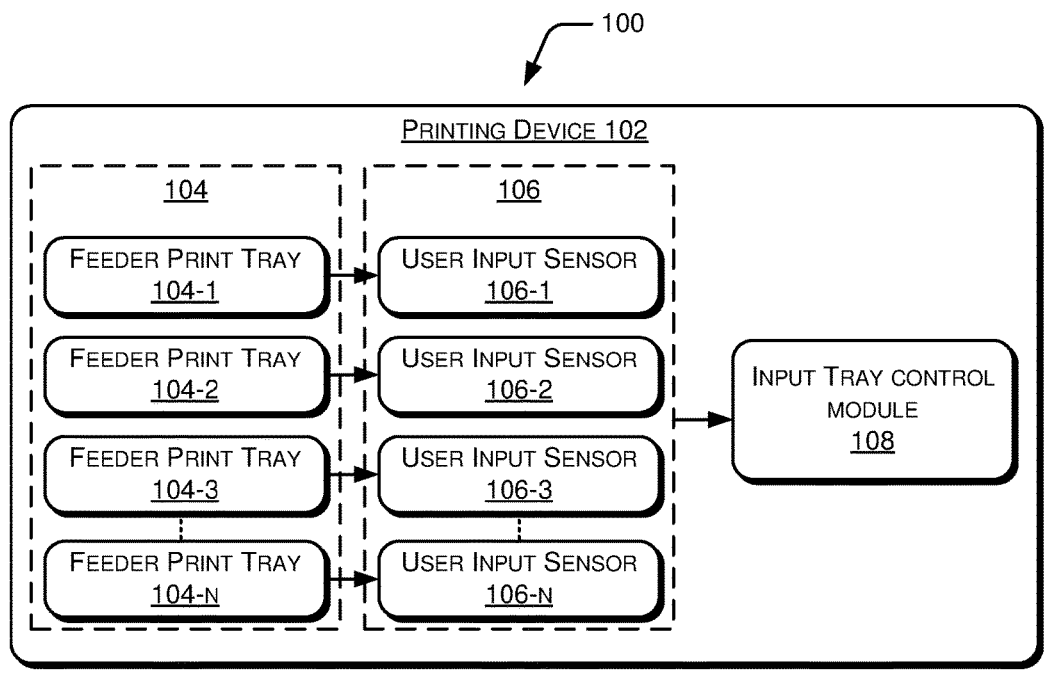
FIG. 1 illustrates a block diagram of a printing device, according to an example of the present subject matter.

Printing devices are provided with print trays, such as feeder print trays and an output print tray for handling print media during a print job. Multiple feeder print trays hold print media to be used for print job. The output print tray holds printed media obtained after the print job gets over. A user may use multiple feeder print trays for holding print media of different or same size and type and select a suitable feeder print tray before initiating a print job. During the print job, print media from the feeder print tray is fetched and printed with content based on user provided data. Printed media, thus obtained, is then rolled out onto the output print tray using rollers. Prior to printing the user may select the printing device to operate in either a default speed or a reduced speed. The user may select a quiet mode option to reduce print speed and noise involved in printing of documents by controlling speed of the rollers. A normal mode of operation may be selected to print at the default speed.

The printing devices are generally provided with a variety of interfaces to allow an operator to control the printing devices and advanced operating features, such as feeder print tray selection and quiet mode selection. Common interfaces comprise a number of systems and devices, such as a combination of touch pad and display screen, a keypad, a mouse control, and wireless interface on a computing device used for giving printing instructions. Such common interfaces are, however, time consuming and complex to use, owing to which users may not utilize the advanced operating features very often. For instance, a user may have to navigate through various user interface windows to open a feeder print tray or a print speed selection window and then select the feeder print tray or the mode of operation, respectively. The user in such a case may have to read a user manual to understand the procedure to be followed for selecting the feeder print tray. Further, the user may also need to correctly identify a feeder print tray name or reference number of the feeder print tray having the printed media the user wishes to use. Further, the user may not be allowed to toggle between quiet mode and a normal mode during a print job and may have to wait for a current print job to finish before changing the print speed.

Example implementations for user input based print tray control are described. As per an example of the present subject matter, a user may provide user inputs for control of feeder print tray and toggle between print speeds of the printer without use of any additional user interfaces or peripherals. In said example, the users may provide user inputs in proximity to the feeder print tray to indicate their inputs to the printing device for controlling the feeder print tray. Similarly, the user may provide user inputs in proximity to an output print tray to toggle between print speeds of the printer. Examples of the user input include a gesture, a touch, a tap, and an audio instruction. The user inputs may be sensed by sensors provided in proximity to the print tray to control the print tray in accordance with the user input.

In one example, for each feeder print tray, an input sensor may be provided in a proximity of the feeder print tray. The input sensor is to sense the user input provided by the user. The input sensor may be placed in an inner surface of the casing of the feeder print tray. Further, the user may be instructed to provide the user input on the outer surface of the casing. In one example, to select a feeder print tray, the user may provide the user input on the outer surface of the casing of the feeder print tray. For instance, the user may tap or touch the particular feeder print tray for selecting the feeder print tray for feeding print media or to open the feeder print tray for loading print media. The input sensor associated with the feeder print tray may sense the user input and transmit an input signal to an input tray control module.

In one example, the input tray control module may correlate the user input as selection of the corresponding feeder print tray by the user and analyze the user input to determine selection attributes corresponding to the provided user input. The input tray control module may then determine a tray control action to be initiated for the selected feeder print tray based on the user input data and the selection attribute.

In one example implementation of the present subject matter, the user may further toggle between one or more modes of operations. Examples of such mode include, but are not limited to, a normal mode and a quiet mode to change print speed of the printing device. The toggling may be affected by tugging the printed media at the output print tray. A pressure sensor placed in proximity to the output print tray or a paper feeder may sense a pressure applied on the printed media by the user while tugging the printed media. The pressure sensor may subsequently provide sensor data to a print speed control module for changing the print speed. On receiving the sensor data, the print speed control module may shift print mode from a current print mode, say, the quiet mode to a second print mode, say, the normal mode for changing the print speed.

The present subject matter thus allows a user to select a feeder print tray by providing user inputs directly on the surface of the feeder print tray. Allowing the user to provide the user inputs on the surface of the feeder print tray facilitates in eliminating the use of complex user interfaces or peripherals for providing the user inputs. Eliminating the use of complex user interfaces makes the printing device user friendly and helps in reducing the time spent by a user in selecting the feeder print tray. The present subject matter further helps in reducing costs involved in providing the user interfaces or peripherals. Additionally, allowing the user to shift the print mode to change print speed of the printing device by tugging the printed media further facilitates in eliminating the use of complex user interfaces or peripherals for providing the user inputs. Further, as the print speed may be changed by tugging the printed media during a print job, the user may not have to wait for the current print job to end before providing the user input for speed change.

The present subject matter is further described with reference to FIGS. 1 to 5. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a printing device 102, according to an example implementation of the present subject matter. The printing device 102 may be used for printing documents on a print media, such as paper. In accordance to an example implementation of the present subject matter, the printing device 102 includes a plurality of feeder print trays 104-1, 104-2, 104-3, . . . , 104-n to hold the print media to be used for printing. The feeder print trays 104-1, 104-2, 104-3, . . . , 104-n are hereinafter collectively referred to as feeder print trays 104 and individually referred to as feeder print tray 104. The feeder print trays 104 may be used to hold print media of different or same types and sizes. A user may select a suitable feeder print tray 104 for a print job and print media from the selected feeder print tray 104 may be fetched and used.

In one implementation, the user may provide at least one user input on an outer surface of a casing of the feeder print tray 104 that the user wants to select. The user may provide the user input for various purposes, such as for feeding the print media or for opening for reloading the print media. The printing device 102 may include a plurality of user input sensors 106-1, 106-2, 106-3, . . . , 106-n to sense the at least one user input provided by the user. The user input sensors 106-1, 106-2, 106-3, . . . , 106-n are hereinafter collectively referred to as user input sensors 106 and individually referred to as user input sensor 106. In one example, a user input sensor 106 is provided in proximity to each of the plurality of feeder print trays 104 to sense the user input on the outer surface of the casing of the corresponding feeder print tray 104.

The user input sensed by the sensor 106 is subsequently provided to an input tray control module 108 of the printing device 102. The input tray control module 108 is communicatively coupled to the plurality of input sensors 106. In one example implementation, the input tray control module 108 correlates the user input as selection of the corresponding feeder print tray 104. The input tray control module 108 may further determine selection attributes corresponding to the user input. The selection attributes may indicate the type or purpose of the user input. The input tray control module 108 may subsequently determine a tray control action to be initiated for the selected feeder print tray 104.

Figure 2:
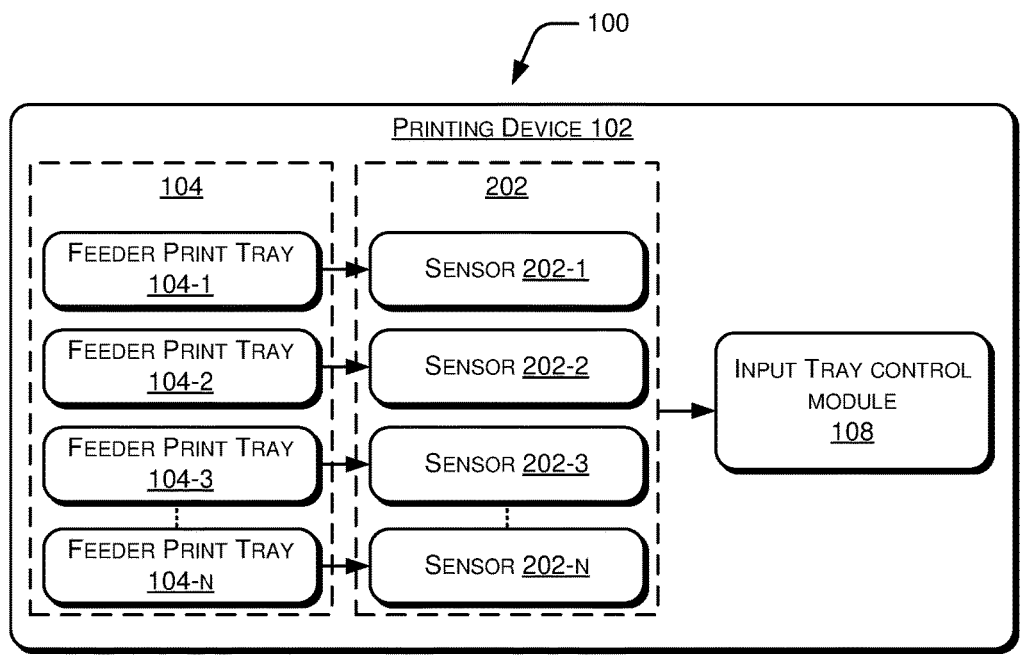
FIG. 2 illustrates a block diagram of a printing device, according to another example of the present subject matter.

FIG. 2 illustrates a block diagram of the printing device 102, according to another example implementation of the present subject matter. In one example, the printing device 102 includes the plurality of feeder print trays 104 to hold print media to be used for printing. The printing device 102 further includes a plurality of sensors 202-1, 202-2, 202-3, . . . , 202-n, hereinafter collectively referred to as sensors 202 and individually referred to as sensor 202. Examples of the sensor 202 include, but are not limited to, a sensor and the touch sensor.

In one example implementation, the sensors 202 are provided in proximity of the feeder print trays 104 to sense at least one tap made by the user on a corresponding feeder print tray 106. The user may tap on the outer surface of the casing of the corresponding feeder print tray 106. Further, the plurality of sensors 202 is communicatively coupled to the input tray control module 108. In one example, the input tray control module 108 may correlate user input data, indicating the tap, as selection of the corresponding feeder print tray 104. The input tray control module 108 may subsequently determine selection attributes corresponding to the user input data. Based on the user input data and the selection attribute, the input tray control module 108 may determine a tray control action to be initiated for the selected feeder print tray 104.

Figure 3:
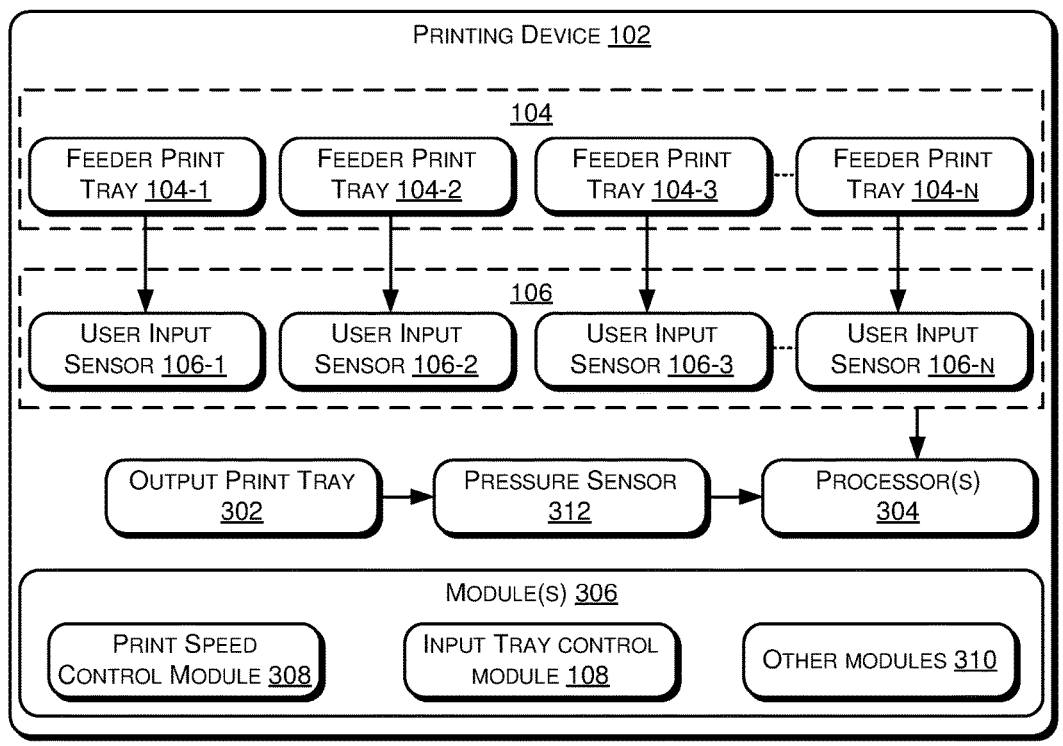
FIG. 3 illustrates a block diagram of a printing device, according to yet another example of the present subject matter.

FIG. 3 illustrates a block diagram of the printing device 102, according to another example of the present subject matter. As previously described, the printing device 102 may be used for printing documents on a print media, such as paper. In accordance to an example implementation of, the printing device 102 includes a plurality of print trays for handling the print media during a print job. For instance, the printing device 102 includes the feeder print trays 104 for holding the print media to be used for printing and an output print tray 302 for holding a printed media for being collected by the user after the print job gets over. The printing device 102 may further include processor(s) 304 and modules 306 for controlling the print trays and other components or units of the printing device 102.

The processor(s) 304 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The module(s) 306, amongst other things, includes routines, programs, objects, components, and data structures, which perform particular tasks or implement particular abstract data types. The modules 306 may also be implemented as signal processor(s), state machine(s), logic circuitries, and/or any other device or component that manipulate signals based on operational instructions. Further, the modules 306 can be implemented by hardware, by computer-readable instructions executed by a processing unit, or by a combination thereof.

The module(s) 306 include the input tray control module 108, a print speed control module 308, and other module(s) 310. In one example, the input tray control module 108 and the print speed control module 308 may control the feeder print trays 104 and the output print tray 302, respectively, based on inputs received in proximity of the trays from the user of the printing device 102.

In one example, the printing device 102 includes sensors provided in proximity of the print trays for sensing inputs provided by the user for controlling the print trays. For instance, the printing device 102 may include the user input sensor(s) 106 and a pressure sensor 312 provided in proximity to the feeder print trays 104 and the output print tray 302. In one example, one user input sensor 106 is provided on an inner surface of a casing of each feeder print tray 104. As previously described, the user input sensors 106 are provided in the inner casing of each of the plurality of feeder print trays 104 to sense the user input provided on the outer surface of the casing of the corresponding feeder print tray 104.

Examples of the user input include a gesture, a touch, a tap, and an audio instruction. Examples of the user input sensor 106 include a gesture sensor, a touch sensor, a sensor, and a speech sensor. In one example implementation, a single type of user input sensor 106 may be provided in the printing device 102 and the user may thus be instructed to provide a corresponding user input. For instance, the printing device 102 may include the sensor as the user input sensor 106 and the user may thus be instructed to tap on the feeder print trays 104, in a predefined place or manner, to provide the user input. Similarly, the printing device 102 may include the gesture sensor as the user input sensor 106 and the user may thus be instructed to use certain gestures as the user input. Alternately, the printing device 102 may include the touch sensor as the user input sensor 106 and the user may thus be instructed to touch on the feeder print trays 104 in a predefined place or manner to provide the user input. Similarly, the printing device 102 may include the speech sensor as the user input sensor 106 and the user may thus be instructed to use a predefined audio instruction as the user input. In another example implementation, a combination of user input sensors 106 may be provided in the printing device 102 and the user may thus be instructed to provide either any of the corresponding user inputs or a combination of the user inputs.

In operation, to select a feeder print tray 104 for feeding print media or to open the feeder print tray 104 for loading print media, the user may provide the user input on the outer surface of the casing of the feeder print tray 104. In one example, the user may vary the user input based on the action that the user wishes to be performed for the selected feeder print tray 104. The user may provide the user input in a particular manner or on a particular place of the feeder print tray 104 or predefined number of times. For instance, if the user wishes the print media to be used from a particular feeder print tray 104, say the feeder print tray 104-1, the user may tap the feeder print tray 104-1 once. If the user wishes print media to be used from a particular feeder print tray 104, say the feeder print tray 104-1, the user may tap the feeder print tray 104-1 twice.

The user input sensor 106 associated with the feeder print tray 104 may sense the user input and transmit an input signal to the input tray control module 108. In one example, the user input sensor 106 may generate the input signal at a first predefined voltage level or a second predefined voltage level based on the type of user input received from the user. For instance, on sensing the user input, say, the tap for a first predefined number of times, say, once, the user input sensor 106 may generate the input signal at the first predefined voltage level, say, one volt. On sensing the user input, say, the tap for a second predefined number of times, say, twice, the input sensor 106 may generate the input signal at the second predefined voltage level, say, five volts. The user input sensor 106 may thus generate the input signal at the first predefined voltage level or the second predefined voltage level based on the type of user inputs, such as predefined gestures, predefined audio instruction, audio instruction of predefined frequency, predefined touch pattern, and touch at predefined places on the feeder print trays 104.

In one example, the input sensor 106 may transmit the input signal to the processor 304 that may process the input signal to obtain input data corresponding to the user input and provide the input data to the input tray control module 108. In another example, the input sensor 106 may directly transmit the input signal to the input tray control module 108 which may process the input signal to obtain input data corresponding to the user input. The user data, obtained from the input signal, may indicate the voltage level of the input signal, indicating the action that the user wishes to be performed. The printing device 102 may further include an analog to digital converter (not shown in the figure) for converting analog input signal to digital signal, if the user input sensor 106 is analog.

The input tray control module 108 may subsequently correlate the user input as selection of the corresponding feeder print tray 104 based on the input data. Further, the input tray control module 108 may analyze the input data to identify the feeder print tray 104 for which the user input is obtained. In one example, the input data may include an identification number corresponding to the feeder print tray 104 or the user input sensor 106 corresponding to the feeder print tray 104. The input tray control module 108 may identify the feeder print tray based on the identification number.

The input tray control module 108 may further analyze the user data corresponding to the user input to determine selection attributes corresponding to the user input. The selection attributes may indicate the action that the user wishes to be performed on the selected feeder print tray 104. In one example, the selection attribute may indicate the voltage level of the input signal. For instance, the selection attribute may be a first predefined attribute if the voltage level is the first predefined voltage level. The selection attribute may be a second predefined attribute if the voltage level is the second predefined voltage level.

The input tray control module 108 may then determine a tray control action to be initiated for the selected feeder print tray 104 based on the user input data and the selection attribute. In one example, the input tray control module 108 may determine the selected feeder print tray 104 to be used for feeding the print media if the selection attribute is the first predefined attribute. The input tray control module 108 may open the selected feeder print tray 104 if the selection attribute is the second predefined attribute. For instance, in the above described example of user varying the number of taps for indicating the action to be performed for the selected feeder print tray 104, the input tray control module 108 may use the selected feeder print tray 104 for feeding the print media for the current or subsequent print job if the selection attribute is the first predefined attribute, i.e., one tap. Further, the input tray control module 108 may open the selected feeder print tray 104 if the selection attribute is the second predefined attribute, i.e., two taps.

Further, once the print job is initiated, user provided data is printed on the print media to obtain the printed media which is further rolled out onto the output print tray 302 using rollers of the printing device 102. In one example, the user may toggle between different print modes of the printing device 102 while a print job is in progress. The different print modes allow the user to control print speed and the noise produced by the printing device 102. For instance, the user may toggle between a normal mode and a quiet mode to change print speed of the printing device 102. Setting the printing device 102 at the normal mode during a print job configures the printing device 102 to print at a normal speed. Printing at the normal speed allows the rollers of the printing device 102 to roll fast, thus making certain level of noise. Setting the printing device 102 at the quiet mode configures the printing device 102 to print at a slower speed, making the rollers to roll slowly, thus making less noise.

In one example, the user may toggle between different print modes by tugging the printed media at the output print tray 302. A pressure applied on the printed media because of the user pulling the printed paper is sensed by the pressure sensor 312. In one example, the pressure sensor 312 may be placed at the output print tray 302. In another example, the pressure sensor 312 may be placed at a paper feeder connected to the output print tray 302. In another example, the pressure sensor 312 may be placed at the rollers. The pressure sensor 312 may subsequently provide sensor data to the print speed control module 308. The sensor data may indicate the user instructions for changing print speed of the printing device 102.

In one example, the pressure sensor 312 may transmit an output signal to the processor 304 that may process the output signal to obtain the sensor data and provide the sensor data to the print speed control module 308. In another example, the pressure sensor 312 may directly transmit the output signal to the print speed control module 308 which may process the output signal to obtain the sensor data. The printing device 102 may further include the analog to digital converter (not shown in the figure) for converting analog output signal to digital signal, if the pressure sensor 312 is analog.

Upon obtaining the sensor data, the print speed control module 308 may change print mode from a current print mode to a second print mode. The print speed control module 308 may further change the print speed of the printing in accordance to the second print mode. In one example, the current print mode may be the quiet mode and the second print mode may be the normal mode. The print speed control module 308 in said example may configure the printing device to operate in the normal mode and print at the normal speed.

Figure 4:
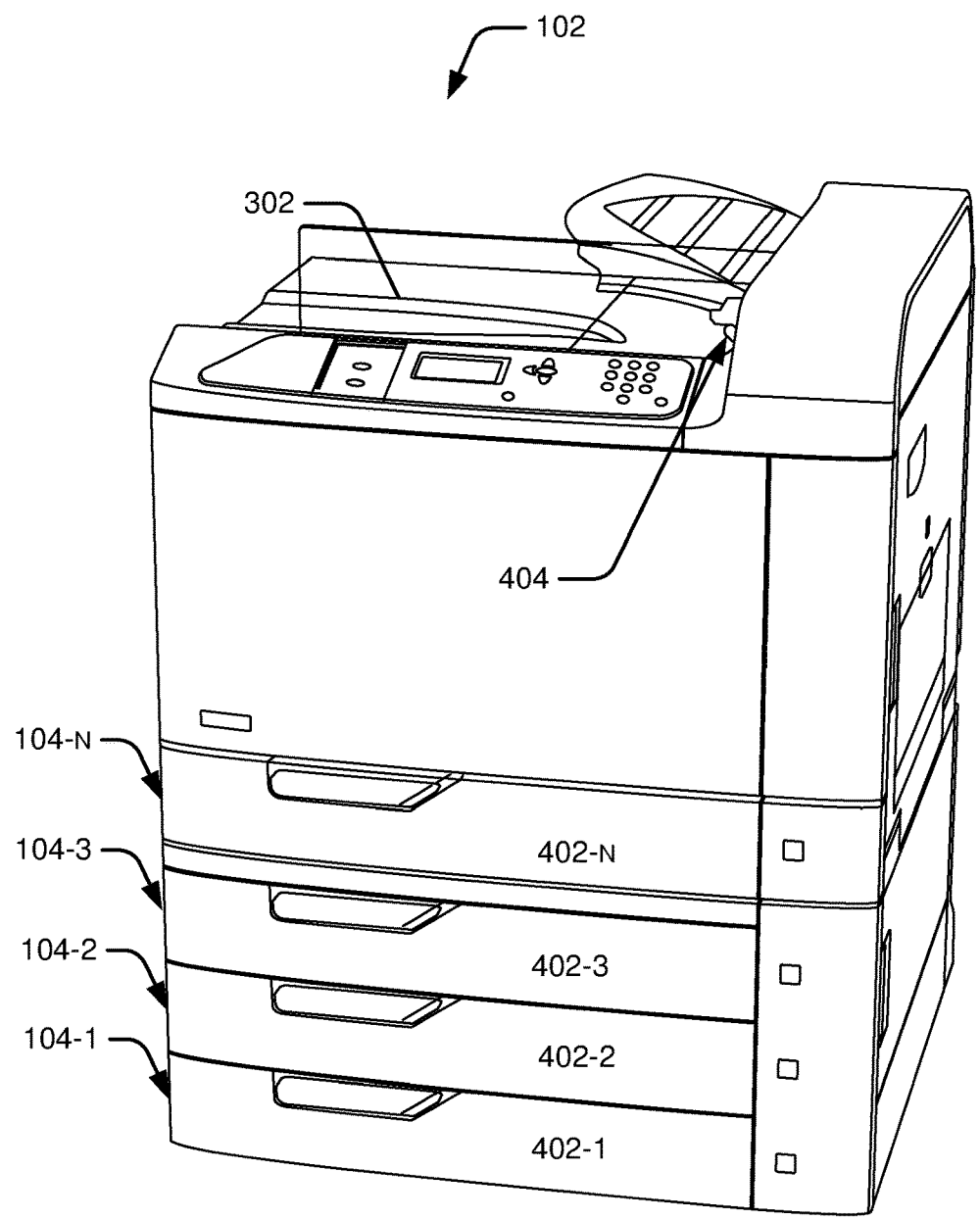
FIG. 4 illustrates a printing device, according to yet another example of the present subject matter.

FIG. 4 illustrates the printing device 102, according to yet another example of the present subject matter. As illustrated, the printing device 102 may include the feeder print trays 104, such as the feeder input tray 104-1, feeder input tray 104-2, feeder input tray 104-3, and feeder input tray 104-n to hold the print media. Further, as previously described, the user may provide the user input on an outer surface of a casing 402-1, 402-2, 402-3, 402-n of the feeder input tray 104-1, feeder input tray 104-2, feeder input tray 104-3, and feeder input tray 104-n, respectively, to select the corresponding feeder input tray 104. The casings 402-1, 402-2, 402-3, 402-n are hereinafter collectively referred to as casing 402. The user input may be sensed by the user input sensor 106 provided on the inner surface of the casing 402 of the feeder input tray 104.

The printing device 102 may further include the output print tray 302 to hold the printed media. In one example, the pressure sensor 312 may be placed in proximity to the output print tray 302, say, at a pressure sensor location as illustrated using an arrow 404.

Figure 5:
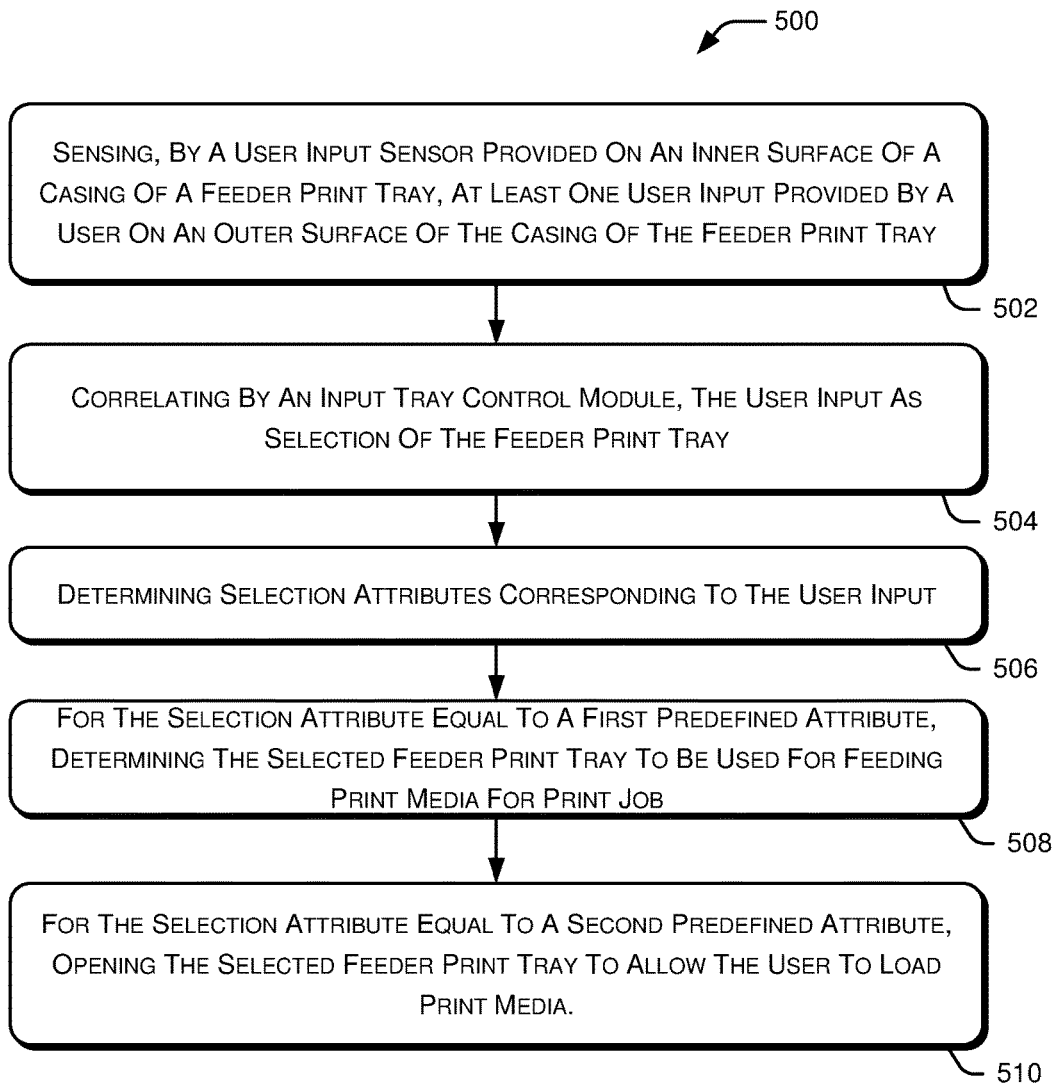
FIG. 5 illustrates a method of controlling print trays based on user inputs, according to another example of the present subject matter.

FIG. 5 illustrates example method 500 for controlling print trays based on user inputs, in accordance with an example of the present subject matter. The order in which the method is described is not intended to be construed as a limitation, and any number of the described method blocks may be combined in any order to implement the aforementioned methods, or an alternative method. Furthermore, the method 500 may be implemented by processing resource or computing device(s) through any suitable hardware, non-transitory machine readable instructions, or combination thereof.

It may also be understood that the method 500 may be performed by printing devices, such as the printing device 102. Furthermore, the method 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

At block 502, at least one user input provided by a user on an outer surface of a casing of a feeder input tray is sensed. In one example, the at least one user input is sensed, by a user input sensor provided on an inner surface of the casing of a feeder input tray. The feeder input tray is of a printing device, such as the printing device 102. The user input sensor, such as the user input sensor 106 may subsequently provide an input signal indicating the at least one user input to either a processor or an input tray control module of the printing device.

At block 504, the user input is correlated as selection of the feeder input tray. In one example, the input tray control module may correlate the user input as selection of the feeder input tray.

At block 506, selection attributes corresponding to the user input are determined. In one example, the input tray control module may determine the selection attributes. The selection attributes may indicate the action that the user wishes to be performed on the selected feeder print tray. In one example, the selection attribute may indicate a voltage level of the input signal to indicate the action which the user wishes to be performed for the selected feeder input tray.

At block 508, the selected feeder print tray is determined to be used for feeding print media for print job if the selection attribute is equal to a first predefined attribute. In one example, the first predefined attribute may be indicated by a first predefined voltage level of the input signal.

At block 510, the selected feeder print tray is opened to allow the user to load print media if the selection attribute is equal to a second predefined attribute. In one example, the second predefined attribute may be indicated by a second predefined voltage level of the input signal.

Although examples for the present subject matter have been described in language specific to structural features and/or methods, it should be understood that the appended claims are not limited to the specific features or methods described. Rather, the specific features and methods are disclosed and explained as examples of the present subject matter.

I claim:

1. A printing device comprising:
 a plurality of feeder print trays to hold print media to be used for printing;
 a user input sensor in proximity to a corresponding feeder print tray to:
  sense a user input on an outer surface of a casing of the corresponding feeder print tray;
  generate user input data based on the user input; and input tray processor circuitry communicatively coupled to the user input sensor, wherein the input tray processor circuitry is to:
correlate the user input data as selection of the corresponding feeder print tray;
determine a selection attribute corresponding to the user input data;
determine a tray control action to be initiated for the corresponding feeder print tray based on the user input data and the selection attribute; and
initiate the tray control action.

2. The printing device as claimed in claim 1, wherein the input tray processor circuitry is to further:
determine the selected feeder print tray to be used for feeding print media, if the selection attribute is a first predefined attribute; and
open the selected feeder print tray if the selection attribute is a second predefined attribute.

3. The printing device as claimed in claim 1, wherein the user input sensor is one of a gesture sensor, a touch sensor, a sensor, and a speech sensor.

4. The printing device as claimed in claim 3, wherein the user input is one of a gesture, a touch, a tap, and an audio instruction.

5. The printing device as claimed in claim 4, wherein the selection attribute is one of a count of gestures, pressure applied during touch, touch duration, count of taps, intensity of tap, volume of audio instruction, and content of audio instruction.

6. The printing device as claimed in claim 1, wherein, the user input sensor is on an inner surface of the casing of the corresponding feeder print tray.

7. The printing device as claimed in claim 1, further comprising:
an output print tray for providing a printed media;
a pressure sensor placed in proximity of the output print tray to sense pressure applied on the printed media by the user by way of pulling;
print speed processor circuitry communicatively coupled to the pressure sensor to:
obtain pressure sensor data indicating user instructions for changing print speed of the printing device; and
change a print mode from current print mode to a second print mode for changing print speed in accordance to the second print mode.

8. The printing device as claimed in claim 1, wherein the selection attribute relates to sensing a predefined action unique to a user input corresponding to a specific number of taps on the outer casing of the corresponding feeder print tray.

9. The printing device as claimed in claim 1, wherein the selection attribute relates to sensing a predefined action unique to a user input corresponding to an amount of pressure applied to the outer surface of the feeder print tray.

10. The printing device as claimed in claim 1, wherein the selection attribute relates to sensing a predefined action unique to a user input corresponding to a duration for which pressure is applied to the outer surface of the feeder print tray.

11. The printing device as claimed in claim 1, wherein the selection attribute relates to sensing a predefined action unique to a user input corresponding to a specific gesture.

12. The printing device as claimed in claim 1, wherein the selection attribute relates to sensing a predefined action unique to a user input corresponding to the content of a sensed audio instruction, or the volume thereof.

13. A method of controlling printer tray selection, the method comprising:
sensing, by a user input sensor on an inner surface of a casing of a respective feeder print tray of a plurality of feeder print trays, a user input on an outer surface of the casing of the respective feeder print tray;
correlating by way of input tray processor circuitry communicatively coupled to each user input sensor, the user input as selection of the respective feeder print tray;
determining a selection attribute corresponding to the user input;
responsive to the selection attribute corresponding to a first predefined attribute, thereby selecting a feeder print tray of the plurality of feeder print trays to be used for feeding print media for a print job; and
responsive to the selection attribute corresponding to a second predefined attribute, opening the selected feeder print tray to allow the user to load print media.

14. The method as claimed in claim 13, wherein the input sensor is one of a gesture sensor, a touch sensor, a sensor, and a speech sensor.

15. The method as claimed in claim 13, wherein the user input is one of a gesture, a touch, a tap, and an audio instruction.

16. The method as claimed in claim 13, wherein the selection attribute is one of a count of gestures, pressure applied during touch, touch duration, count of taps, volume of audio instruction, and content of audio instruction.

17. A printing device comprising:
a plurality of feeder print trays to hold print media to be used for printing;
a plurality of sensors in proximity to each of the plurality of feeder print trays to:
sense a tap by a user on an outer surface of a casing of a corresponding feeder print tray; and
input tray processor circuitry communicatively coupled to each of the plurality of sensors to:
generate user input data indicative of a number of taps sensed on the outer surface of the casing as selection of the corresponding feeder print tray;
determine a selection attribute corresponding to the user input data; and
determine a tray control action to be initiated for the corresponding feeder print tray based on the user input data and the selection attribute.

18. The printing device as claimed in claim 17, wherein the input tray processor circuitry is to further:
determine the selected feeder print tray to be used for feeding print media, if the selection attribute is a first predefined attribute; and
open the selected feeder print tray if the selection attribute is a second predefined attribute.

19. The printing device as claimed in claim 17, wherein the selection attribute is one of a count of taps and intensity of tap.

20. The printing device as claimed in claim 17, wherein for each of the plurality of feeder print trays, the corresponding sensor is on an inner surface of the casing of the feeder print tray.

* * * * *